(12) United States Patent
Kiyota et al.

(10) Patent No.: US 11,373,785 B2
(45) Date of Patent: Jun. 28, 2022

(54) GROMMET AND WIRE HARNESS

(71) Applicant: Yazaki Corporation, Tokyo (JP)

(72) Inventors: Hirotaka Kiyota, Shizuoka (JP);
Masaru Kiuchi, Shizuoka (JP);
Takeshi Onoda, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/172,001

(22) Filed: Feb. 9, 2021

(65) Prior Publication Data
US 2021/0257132 A1    Aug. 19, 2021

(30) Foreign Application Priority Data

Feb. 17, 2020    (JP) .................................. 2020-024486

(51) Int. Cl.
*H01B 17/58*     (2006.01)
*H01B 7/00*      (2006.01)
*B60R 16/02*     (2006.01)

(52) U.S. Cl.
CPC ......... *H01B 17/583* (2013.01); *H01B 7/0045* (2013.01); *B60R 16/0222* (2013.01)

(58) Field of Classification Search
None
See application file for complete search history.

(56) References Cited

U.S. PATENT DOCUMENTS

| | | | |
|---|---|---|---|
| 6,372,986 B1* | 4/2002 | Saeki .................. | B60R 16/0222 174/152 G |
| 6,708,366 B2* | 3/2004 | Ono ........................ | H02G 3/22 16/2.5 |
| 8,022,304 B2* | 9/2011 | Baydoun ............. | B60R 16/0222 174/152 G |
| 2003/0014924 A1* | 1/2003 | Nakamura .......... | B60R 13/0846 52/1 |
| 2017/0174154 A1* | 6/2017 | Kamenoue ............... | H02G 3/38 |
| 2017/0246999 A1* | 8/2017 | Nakagawa ............... | F16L 11/11 |
| 2017/0349123 A1* | 12/2017 | Katoh .................. | H01B 17/583 |
| 2018/0261360 A1* | 9/2018 | Ujita .................... | B60R 16/0207 |

(Continued)

FOREIGN PATENT DOCUMENTS

| | | | |
|---|---|---|---|
| CA | 2153209 A1 | * | 7/1995 |
| CN | 106 058 756 A | | 10/2016 |

(Continued)

*Primary Examiner* — Binh B Tran
*Assistant Examiner* — Muhammed Azam
(74) *Attorney, Agent, or Firm* — Kenealy Vaidya LLP

(57) ABSTRACT

A grommet includes a fitting body to be fitted in a wall body, a sound insulation wall body that has an annular shape and is in a space part inside of the fitting body, cylinders that are projected from both ends of the fitting body in an axial direction and allow a harness body in the space part to be drawn outward via inside of the cylinders, and an inner cylinder interposed between one cylinder and the harness body, in which the cylinder, having the inner cylinder interposed between the cylinder and the harness body, has a first cylindrical part on a free end side, a second cylindrical part having a diameter larger than a diameter of the first cylindrical part, and an intermediate tubular part between the first cylindrical part and the second cylindrical part. The inner cylinder has a variable cylindrical part.

5 Claims, 6 Drawing Sheets

(56) References Cited

U.S. PATENT DOCUMENTS

| | | | |
|---|---|---|---|
| 2018/0265018 A1* | 9/2018 | Yabashi | F16L 5/10 |
| 2019/0389403 A1* | 12/2019 | Yokoyama | B60R 16/0222 |
| 2019/0393687 A1* | 12/2019 | Yokoyama | H02G 3/0456 |
| 2020/0079303 A1* | 3/2020 | Yoshimura | B60R 16/0222 |
| 2020/0079304 A1* | 3/2020 | Yoshimura | B60R 16/0222 |
| 2020/0080583 A1* | 3/2020 | Yoshimura | B62D 27/065 |
| 2021/0101543 A1* | 4/2021 | Toyoda | B60R 16/0222 |
| 2021/0138980 A1* | 5/2021 | Cho | B60R 16/0222 |
| 2021/0241944 A1* | 8/2021 | Yamaguchi | H01B 17/301 |
| 2021/0257131 A1* | 8/2021 | Kiyota | H01B 17/583 |

FOREIGN PATENT DOCUMENTS

| | | | | |
|---|---|---|---|---|
| CN | 107128259 A | * | 9/2017 | B60R 16/0215 |
| CN | 107431344 A | * | 12/2017 | B60R 16/0222 |
| CN | 108621979 A | * | 10/2018 | B60R 16/0215 |
| CN | 113270830 A | * | 8/2021 | H01B 17/583 |
| DE | 202006019791 U1 | * | 5/2007 | H01R 13/5205 |
| DE | 102008049258 A1 | * | 4/2010 | H02G 15/007 |
| DE | 202009000899 U1 | * | 7/2010 | H01R 13/506 |
| DE | 102017209290 A1 | * | 12/2017 | B60R 16/0222 |
| EP | 798166 A2 | * | 10/1997 | B60R 16/0222 |
| EP | 1101656 A1 | * | 5/2001 | B60R 16/0222 |
| EP | 1157895 A1 | * | 11/2001 | B60R 16/0222 |
| EP | 1876067 A1 | * | 1/2008 | B60R 16/0222 |
| EP | 3702220 A1 | * | 9/2020 | B60R 16/0215 |
| EP | 3865349 A1 | * | 8/2021 | F16L 5/00 |
| EP | 3865350 A1 | * | 8/2021 | H01B 17/583 |
| GB | 2338613 A | * | 12/1999 | B60R 16/0222 |
| JP | H09120727 A | * | 10/1995 | |
| JP | H09265846 A | * | 3/1996 | |
| JP | H10271643 A | * | 3/1997 | |
| JP | H11-248044 A | | 9/1999 | |
| JP | 2000041320 A | * | 2/2000 | B60R 16/0222 |
| JP | 2000249261 A | * | 9/2000 | |
| JP | 2001153270 A | * | 6/2001 | |
| JP | 2002058142 A | * | 2/2002 | |
| JP | 2005033884 A | * | 2/2005 | |
| JP | 2009296741 A | * | 12/2009 | B60R 16/0222 |
| JP | 2010-74924 A | | 4/2010 | |
| JP | 2011188619 A | * | 9/2011 | |
| JP | 2015080340 A | * | 4/2015 | B60R 16/0215 |
| JP | 2016092250 A | * | 5/2016 | B60R 16/0215 |
| JP | 5952527 B2 | * | 7/2016 | |
| JP | 2017-99233 A | | 6/2017 | |
| JP | 2017-158368 A | | 9/2017 | |
| JP | 2017216836 A | * | 12/2017 | B60R 16/02 |
| JP | 2017225207 A | * | 12/2017 | B60R 16/02 |
| JP | 6568389 B2 | * | 8/2019 | |
| JP | 2020120443 A | * | 8/2020 | B60R 16/0215 |
| JP | 2021068800 A | * | 4/2021 | B60R 16/0207 |
| JP | 2021068881 A | * | 4/2021 | |
| JP | 2021090297 A | * | 6/2021 | B60R 16/0215 |
| JP | 2021175223 A | * | 11/2021 | |
| KR | 101498 826 B1 | | 3/2015 | |
| WO | WO-2008011854 A1 | * | 1/2008 | B01D 53/268 |
| WO | WO-2009113220 A1 | * | 9/2009 | B60R 16/0222 |
| WO | WO-2009147764 A1 | * | 12/2009 | B60R 16/0222 |
| WO | WO-2017208933 A1 | * | 12/2017 | B60R 16/02 |
| WO | WO-2017217213 A1 | * | 12/2017 | B60R 16/02 |
| WO | WO-2021079545 A1 | * | 4/2021 | |
| WO | WO-2021251163 A1 | * | 12/2021 | |

* cited by examiner

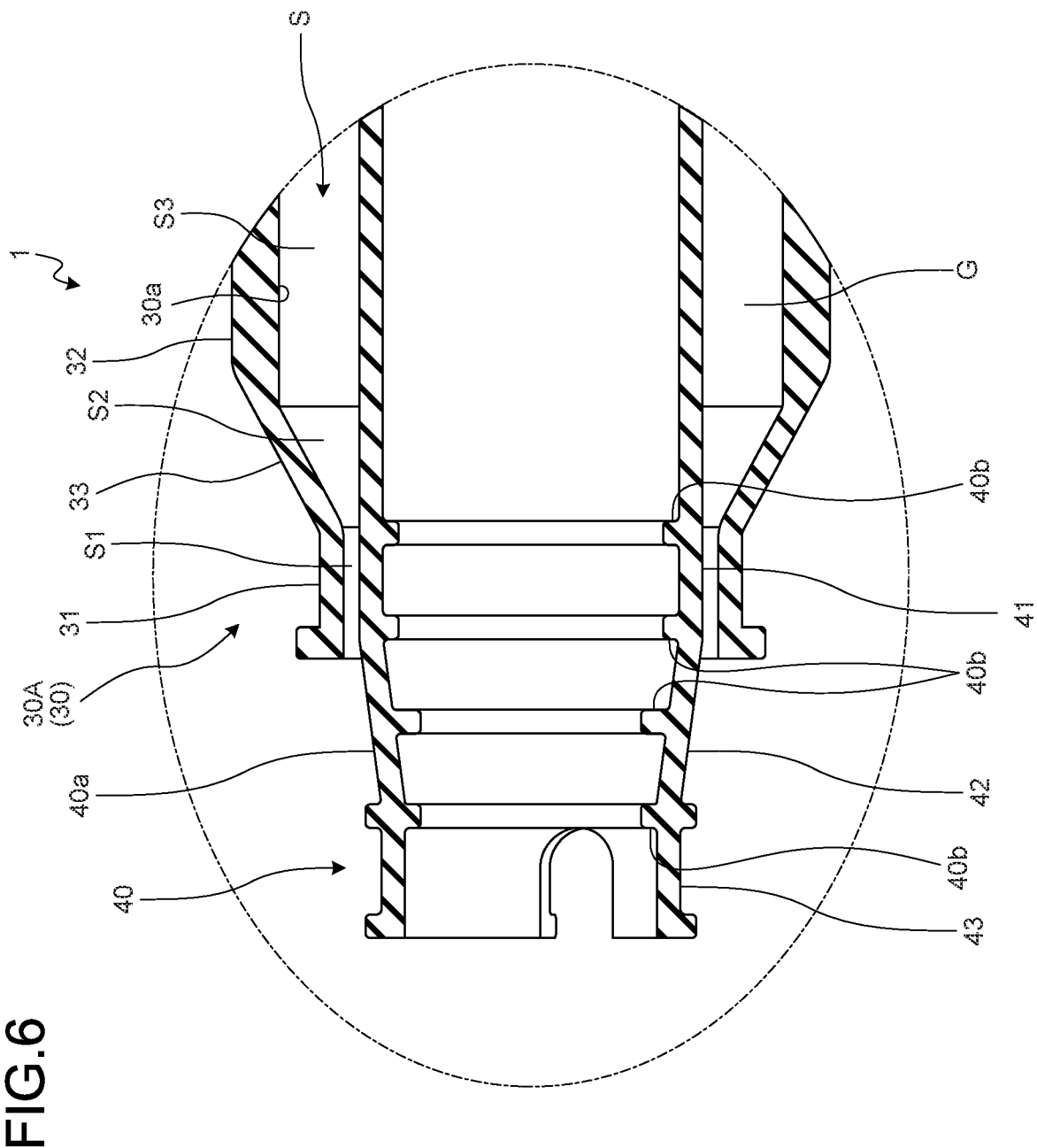

GROMMET AND WIRE HARNESS

CROSS-REFERENCE TO RELATED APPLICATION(S)

The present application claims priority to and incorporates by reference the entire contents of Japanese Patent Application No. 2020-024486 filed in Japan on Feb. 17, 2020.

BACKGROUND OF THE INVENTION

1. Field of the Invention

The present invention relates to a grommet and a wire harness.

2. Description of the Related Art

Conventionally, for a wire harness, an electric wire is inserted into a circular through hole provided in a wall body (for example, a panel of a vehicle body in a vehicle, or the like), so that the electric wire is arranged in both spaces separated by the wall body. Therefore, in order to protect the electric wire from a periphery of the through hole and prevent liquid from entering a gap between the through hole and the electric wire, a grommet that fills the gap is attached to the wall body. For example, the grommet has a fitting body that fits a periphery of the through hole in an annular fitting groove and routes the electric wire inward along a hole axis of the through hole, a first cylinder that has a cylindrical shape and is projected further than one end of the fitting body in an axial direction and allows the electric wire inside of the fitting body to be drawn outward via inside of the cylinder, and a second cylinder that is projected further than another end of the fitting body in the axial direction and allows the electric wire inside of the fitting body to be drawn outward via inside of the cylinder. In addition, in this grommet, a soundproofing measure is taken in order to reduce sound transmission between both the spaces separated by the wall body. This type of grommet is disclosed in, for example, Japanese Patent Application Laid-open No. 2017-99233 described below. In a grommet according to Japanese Patent Application Laid-open No. 2017-99233, a sound absorption chamber that causes entered sound to be absorbed and a sound insulation wall that reduces permeation of the entered sound are formed inside a fitting body.

By the way, a sound absorption chamber is formed by a sealed air layer. In the grommet according to Japanese Patent Application Laid-open No. 2017-99233, each of a first cylinder and a second cylinder is inserted inside the fitting body, and each of a first outer cylinder that has a diameter larger than a diameter of the first cylinder and is concentric with the first cylinder and a second outer cylinder that has a diameter larger than a diameter of a second cylinder and is concentric with the second cylinder is projected outward from an end of a fitting body in the axial direction. An annular gap is provided between the first cylinder and the first outer cylinder, and between the second cylinder and the second outer cylinder.

Therefore, in the grommet according to Japanese Patent Application Laid-open No. 2017-99233, a sealed air layer is formed inside of the fitting body by filling the annular gap by winding a tie band, tape, or the like, from an outer peripheral surface side of the first outer cylinder and the second outer cylinder to fill the annular gap. However, in this grommet, the first outer cylinder and the second outer cylinder are bent, or the like, due to winding of the tie band, or the like, and therefore, it is necessary to wind the tie band, or the like, ensuring that the annular gap is filled. As described above, in the grommet according to Japanese Patent Application Laid-open No. 2017-99233, winding a tie band, or the like requires time and effort.

SUMMARY OF THE INVENTION

The present invention has been made in view of the issues described above, and an object of the present invention is to provide a grommet and wire harness capable of improving soundproofing performance while improving assembly workability.

In order to achieve the above mentioned object, a grommet according to one aspect of the present invention includes a fitting body that fits a periphery of a circular through hole of a wall body in an annular fitting groove of an outer wall, and allows a harness body routed in a space part inside of the outer wall along a hole axis of the circular through hole to be drawn out of the space part from each of drawing outlets on both ends in an axial direction, the drawing outlets having a circular shape; an annular sound insulation wall body that has a central axis coaxial with an axis of the fitting body, and is projected in the space part from an inner peripheral wall surface of the outer wall; a cylinder that has a cylindrical shaft coaxial with the axis of the fitting body, is projected outward from a periphery of each of the drawing outlets, and allows the harness body in the space part to be drawn outward via inside of the cylinder; and an inner cylinder that has a cylindrical shaft coaxial with the axis of the fitting body, is interposed at least one of between one of the cylinders and the harness body and between another of the cylinders and the harness body, has an outer peripheral surface arranged to face an inner peripheral surface of the cylinder with a gap, and is drawn from the drawing outlet into the space part to be coaxially connected to an inner peripheral edge of the sound insulation wall body, wherein the cylinder having the inner cylinder interposed between the cylinder and the harness body has a first cylindrical part on a free end, a second cylindrical part having a diameter larger than a diameter of the first cylindrical part and being arranged closer to the drawing outlet than the first cylindrical part is, and an intermediate tubular part in which an upper base side end is coaxially connected to an end of the first cylindrical part, the end being on a second cylindrical part side, and a lower base side end is coaxially connected to an end of the second cylindrical part, the end being on a first cylindrical part side, and the inner cylinder has a variable cylindrical part that is elastically deformed outward in a radial direction by the harness body inside of the cylinder, causes the outer peripheral surface to adhere to the inner peripheral surface of the first cylindrical part, and eliminates cylindrical-shaped space between the inner cylinder and the first cylindrical part in tubular space corresponding to the gap.

According to another aspect of the present invention, in the grommet, it is desirable that the inner cylinder is projected further outward in a cylindrical shaft direction than the first cylindrical part is.

According to still another aspect of the present invention, in the grommet, it is desirable that the cylinder not having the inner cylinder interposed between the cylinder and the harness body has a cylindrical part elastically deformed outward in the radial direction by the harness body inside of the cylinder.

In order to achieve the above mentioned object, a wire harness according to still another aspect of the present invention includes a harness body; and a grommet that protects the harness body, wherein the grommet includes a fitting body that fits a periphery of a circular through hole of a wall body in an annular fitting groove of an outer wall, and allows a harness body routed in a space part inside of the outer wall along a hole axis of the circular through hole to be drawn out of the space part from each of drawing outlets on both ends in an axial direction, the drawing outlets having a circular shape, an annular sound insulation wall body that has a central axis coaxial with an axis of the fitting body, and is projected in the space part from an inner peripheral wall surface of the outer wall, a cylinder that has a cylindrical shaft coaxial with the axis of the fitting body, is projected outward from a periphery of each of the drawing outlets, and allows the harness body in the space part to be drawn outward via inside of the cylinder, and an inner cylinder that has a cylindrical shape and has a cylindrical shaft coaxial with the axis of the fitting body, is interposed at least one of between one of the cylinders and the harness body and between another of the cylinders and the harness body, has an outer peripheral surface arranged to face an inner peripheral surface of the cylinder with a gap, and is drawn from the drawing outlet into the space part to be coaxially connected to an inner peripheral edge of the sound insulation wall body, the cylinder having the inner cylinder interposed between the cylinder and the harness body has a first cylindrical part on a free end side, a second cylindrical part having a diameter larger than a diameter of the first cylindrical part and being arranged closer to the drawing outlet than the first cylindrical part is, and an intermediate tubular part in which an upper base side end is coaxially connected to an end of the first cylindrical part, the end being on a second cylindrical part side, and a lower base side end is coaxially connected to an end of the second cylindrical part, the end being on a first cylindrical part side, and the inner cylinder has a variable cylindrical part that is elastically deformed outward in a radial direction by the harness body inside of the cylinder, causes the outer peripheral surface to adhere to the inner peripheral surface of the first cylindrical part, and eliminates the cylindrical-shaped space between the inner cylinder and the first cylindrical part in tubular space corresponding to the gap.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is an enlarged view of a part B in FIG. 5.

DETAILED DESCRIPTION OF THE PREFERRED EMBODIMENTS

An embodiment of the grommet and wire harness according to the present invention will be described in detail with reference to the drawings below. It should be noted that the present invention is not limited to the embodiment.

Embodiment

One of embodiments of the grommet and the wire harness according to the present invention will be described with reference to FIGS. 1 to 6.

Figure 1:
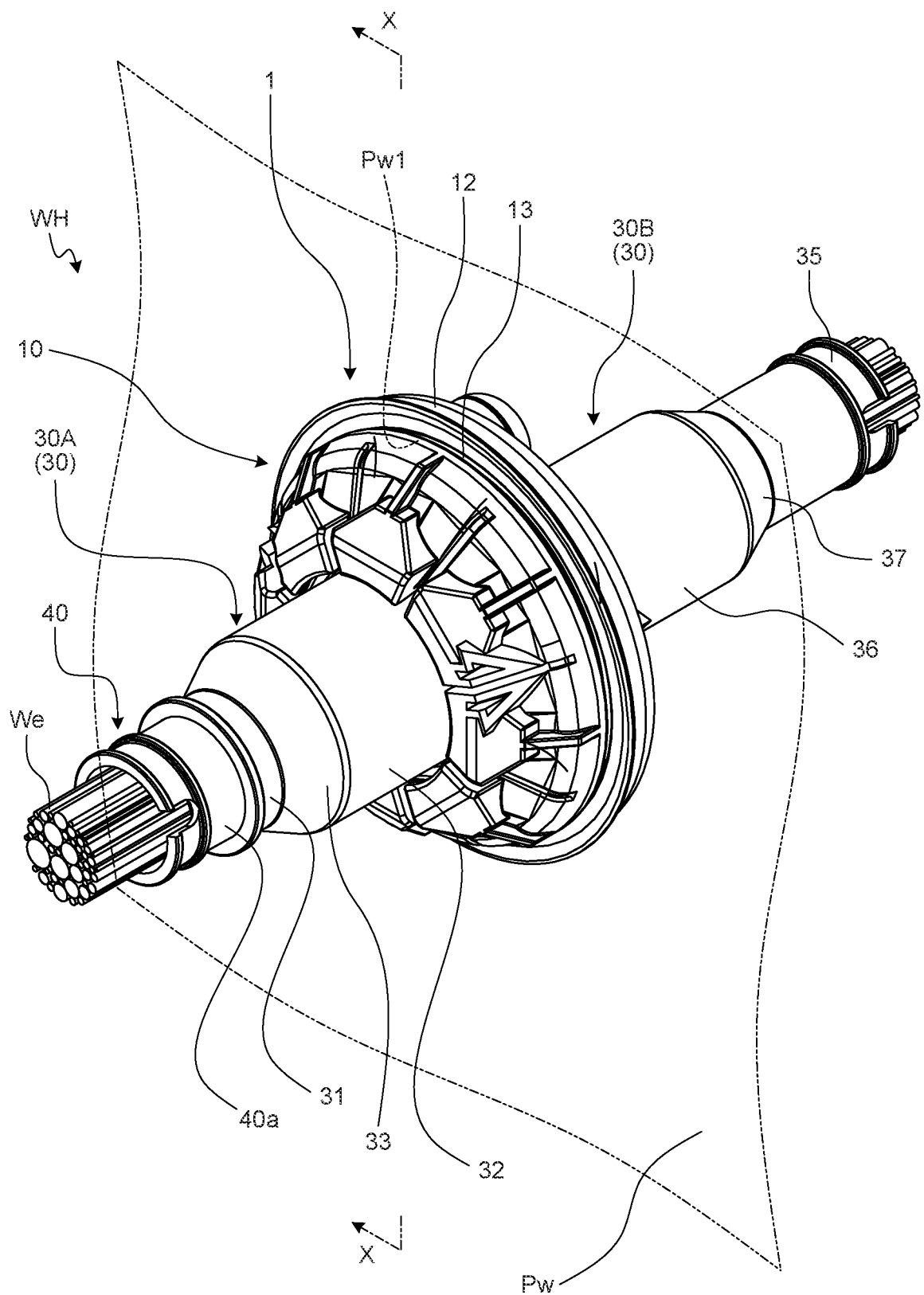
FIG. 1 is a perspective view illustrating a grommet and wire harness according to an embodiment.
Figure 2:
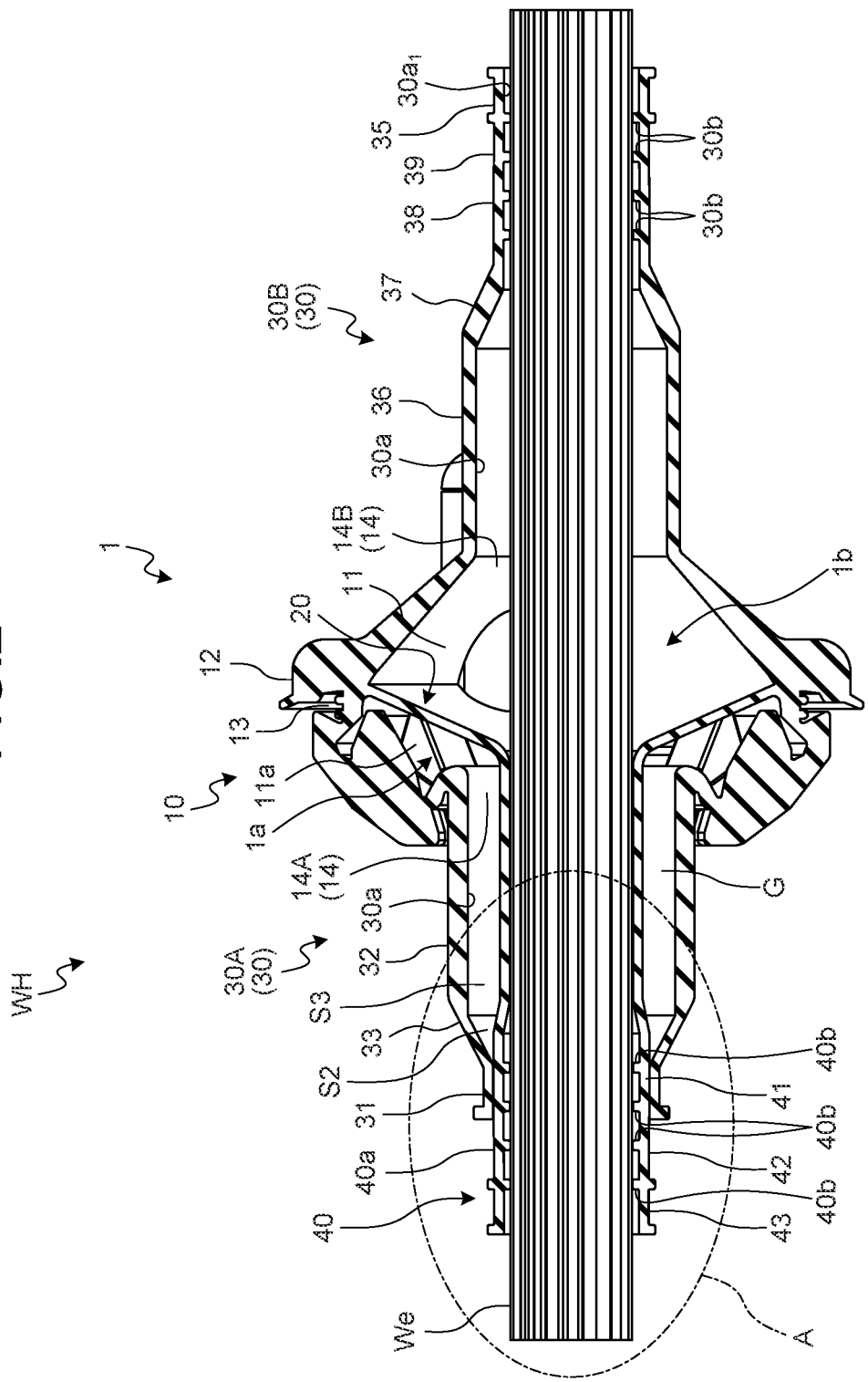
FIG. 2 is a cross-sectional view taken along the line X-X in FIG. 1.
Figure 3:
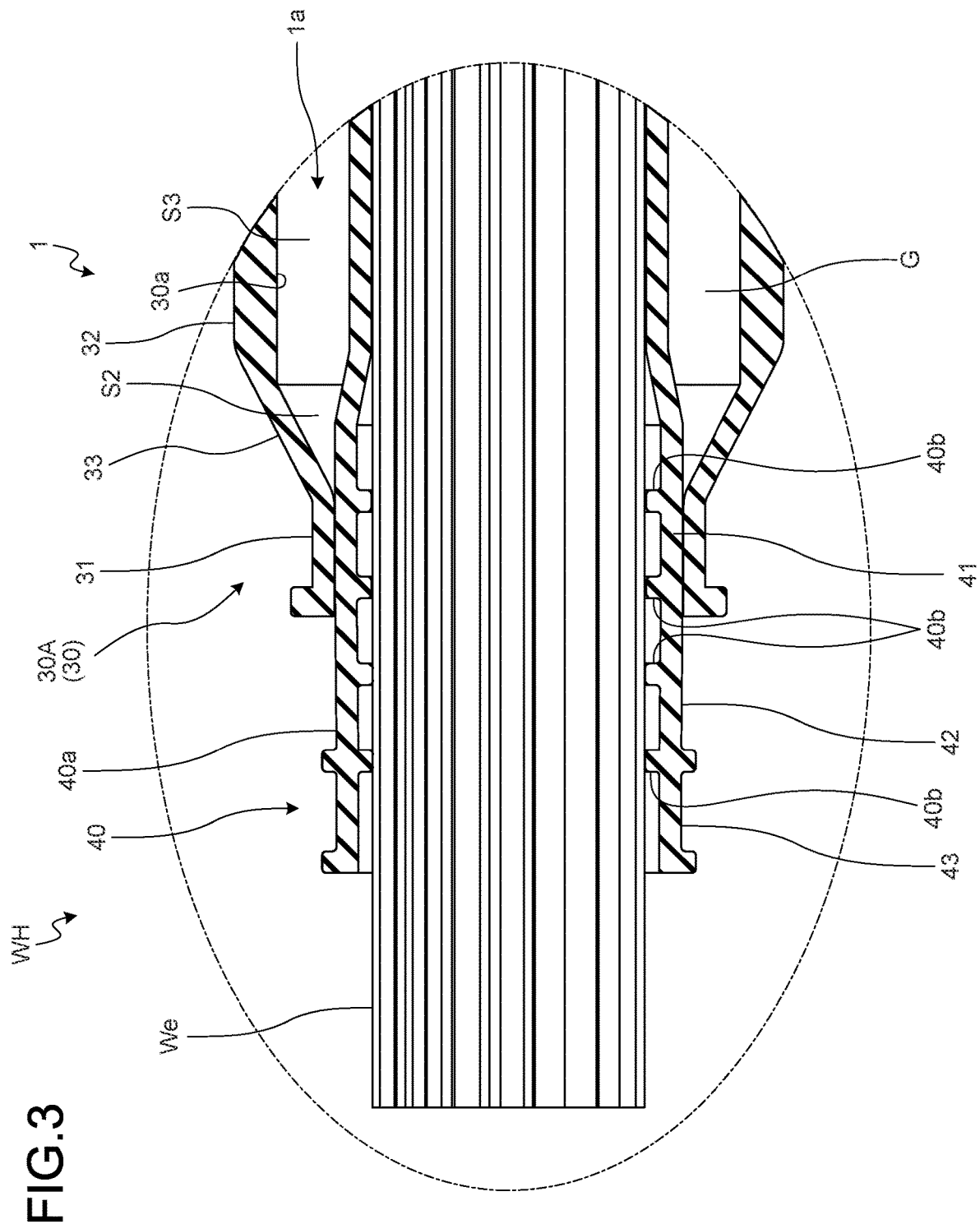
FIG. 3 is an enlarged view of a part A in FIG. 2.
Figure 4:
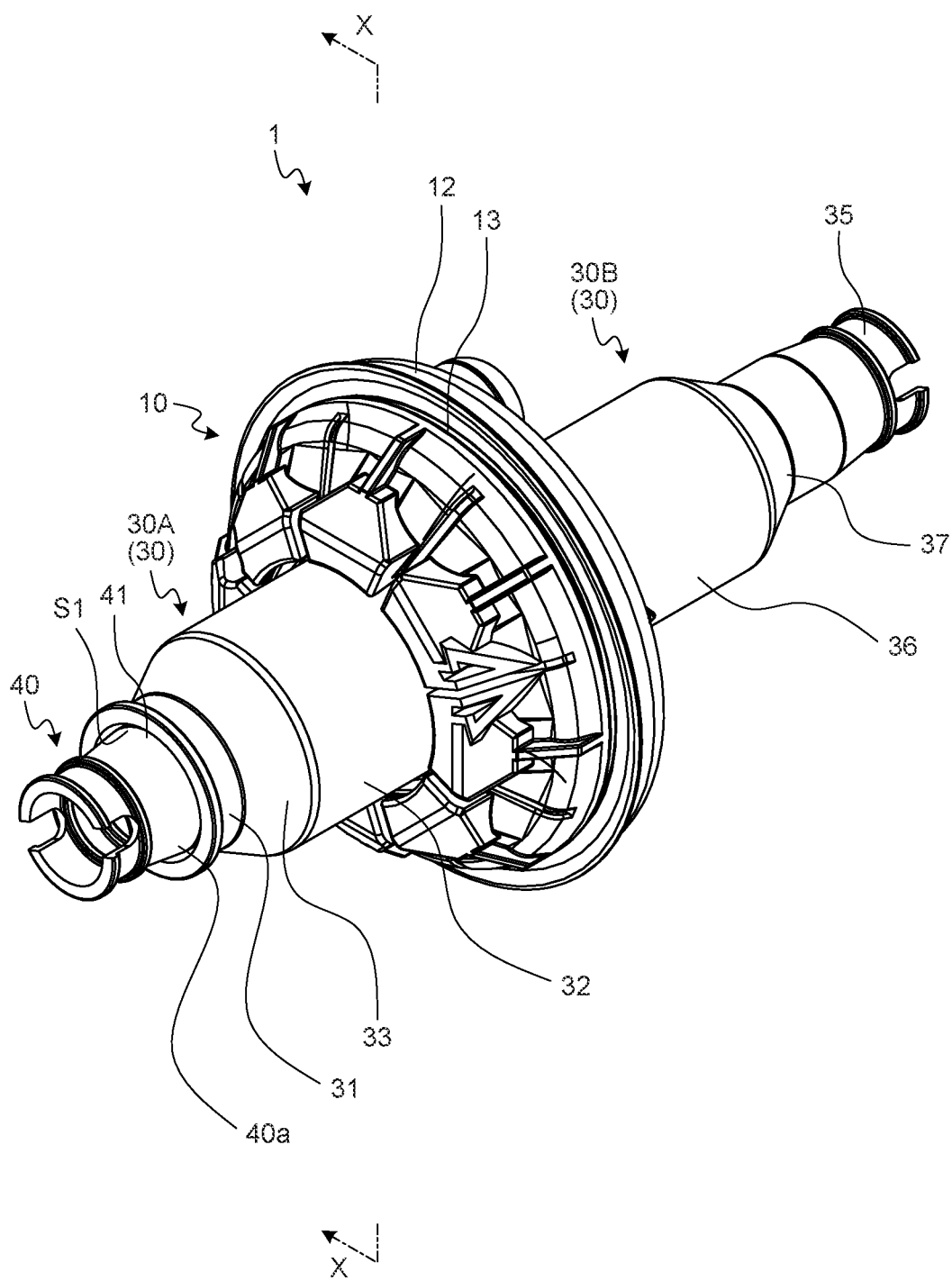
FIG. 4 is a perspective view illustrating a grommet before being incorporated into a harness body.

Reference numeral 1 illustrated in FIGS. 1 to 6 indicates the grommet according to the present embodiment. The grommet 1 is for protecting a harness body We inserted into a through hole Pw1 of a wall body Pw, the through hole Pw1 having a circular shape. The harness body We has one electric wire or is a bundle of a plurality of electric wires, and may be an electric wire as a communication line or an electric wire as a power supply line. In a case where the harness body We includes a plurality of electric wires, the plurality of electric wires is grouped together by an exterior part such as, for example, a corrugated tube or resin tape. For example, in a case of a vehicle, the wall body Pw is a panel of a vehicle body, or the like. The harness body We is drawn in two spaces (for example, an engine compartment and a passenger compartment) separated by the wall body Pw by being inserted into the through hole Pw1 of the wall body Pw. For example, the harness body We plays a role in communication between devices in each space, or plays a role in supplying power from a power supply in one space to an electric device in another space. The grommet 1 is attached to the wall body Pw in order to protect the harness body We from a periphery of the through hole Pw1 in the wall body Pw, and to prevent liquid (water, or the like) from entering a gap between the through hole Pw1 and the harness body We. Here, the grommet 1 and the harness body We incorporated into each other is referred to as a wire harness WH (FIGS. 1 to 3).

The grommet 1 is molded from elastic material such as an elastomer. The grommet 1 is molded by a fitting body 10, a sound insulation wall body 20, two cylinders 30, 30, and an inner cylinder 40, which will be described below, integrated together.

Figure 5:
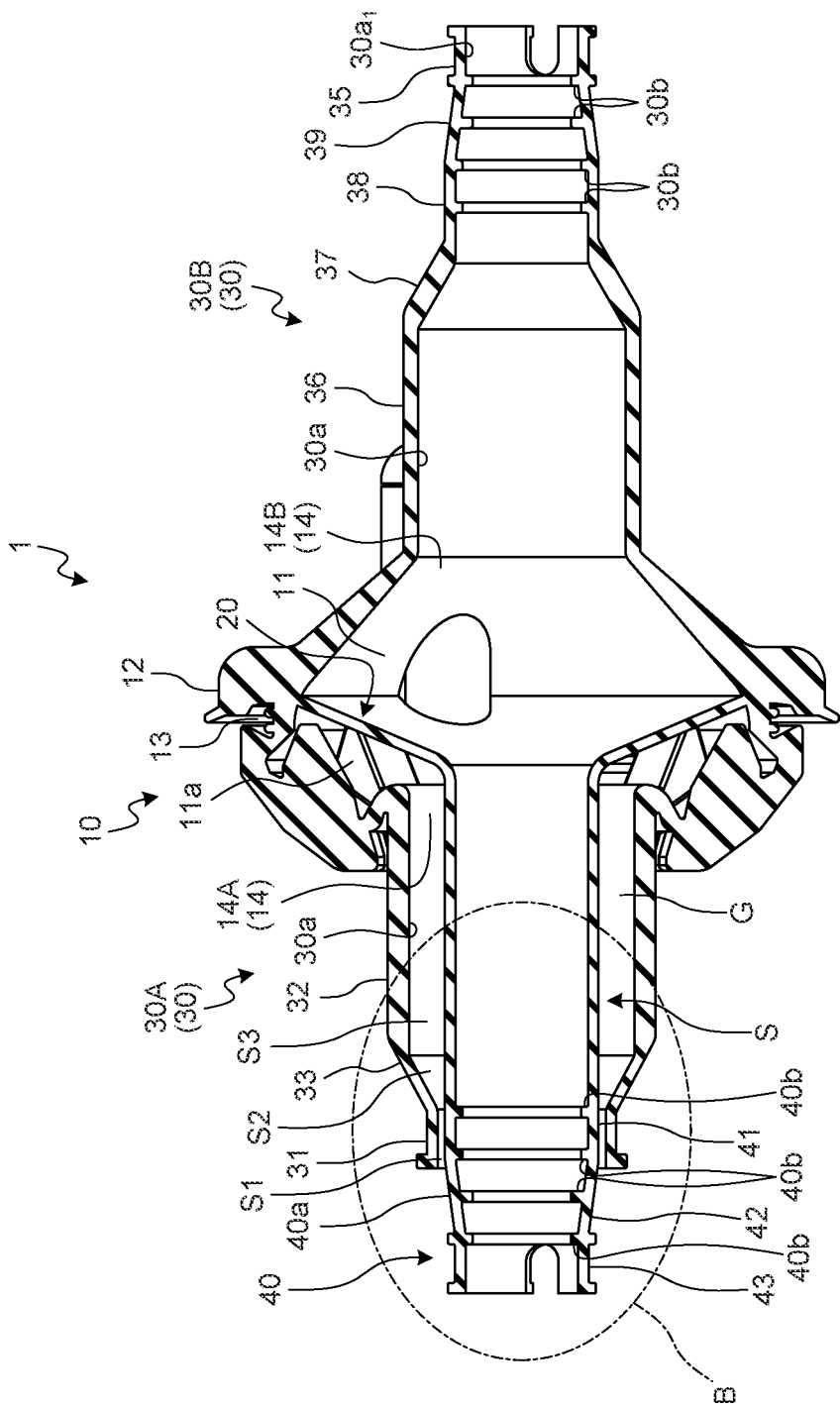
FIG. 5 is a cross-sectional view taken along the line X-X in FIG. 4.

The grommet 1 has the fitting body 10 fitted in a periphery of the through hole Pw1 (FIGS. 1, 2, 4, and 5). The fitting body 10 is formed by an outer wall 12 having a space part 11 inside (FIGS. 2 and 5). For example, the outer wall 12 has a shape such that two truncated cone-shaped tubular parts are coaxially combined. In the outer wall 12, lower bases of tubular parts are coaxially connected to each other, the lower bases having the same diameter, and upper bases of the tubular parts are arranged at respective ends in the axial direction.

On an outer peripheral wall surface of the outer wall 12, an annular fitting groove 13 for fitting a periphery of the through hole Pw1 in the wall body Pw is coaxially formed (FIGS. 1, 2, 4, and 5). The fitting groove 13 is provided on a connection part of a lower base side of each of the tubular parts of the outer wall 12 or on a lower base side of either one of the tubular parts of the outer wall 12.

Further, the harness body We is routed along a hole axis of the through hole Pw1 in the space part 11 inside of the outer wall 12 (FIG. 2). The fitting body 10 allows the harness body We to be drawn out of the space part 11 from drawing outlets 14, 14 having a circular shape, which are on both ends in the axial direction. In the outer wall 12, the upper base of each of the tubular parts is open, and the two openings having a circular serve as drawing outlets 14, 14. Hereinafter, as necessary, one drawing outlet 14 will be referred to as a first drawing outlet 14A, and another drawing outlet 14 will be referred to as a second drawing outlet 14B.

Further, the grommet 1 has a central axis coaxial with an axis of the fitting body 10, and has the sound insulation wall body 20 having an annular shape, which is projected from an inner peripheral wall surface of the outer wall 12 of the space part 11 (FIGS. 2 and 5). The sound insulation wall body 20 may be projected inward in a radial direction from the inner peripheral wall surface of the outer wall 12, or may be projected inward in the radial direction while inclining from the inner peripheral wall surface of the outer wall 12 toward the one drawing outlet 14 or the another drawing outlet 14. In the grommet 1, the sound insulation wall body 20 reduces permeation of sound entered the space part 11 from the outside. The sound insulation wall body 20 illustrated here is projected inward in the radial direction while inclining from the inner peripheral wall surface of the outer wall 12 toward the first drawing outlet 14A.

Further, the grommet 1 has cylinders 30, 30 that have a cylindrical shaft coaxial with the axis of the fitting body 10, are projected outward from a periphery of each of the drawing outlets 14, 14 for each of the drawing outlets 14, 14, and allow the harness body We in the space part 11 to be drawn outward via inside of the cylinder (FIGS. 1, 2, 4, and 5). One cylinder 30 has a cantilever shape in which an end on the one drawing outlet 14 is a fixed end and an end on a projection direction side along a cylindrical shaft direction is a free end. Further, another cylinder 30 has a cantilever shape in which an end on the another drawing outlet 14 is a fixed end and an end on a projection direction side along the cylindrical shaft direction is a free end. Hereinafter, as necessary, one cylinder 30 will be referred to as a first cylinder 30A, and another cylinder 30 will be referred to as a second cylinder 30B. In the grommet 1, the first cylinder 30A is projected from the first drawing outlet 14A, and the second cylinder 30B is projected from the second drawing outlet 14B.

Moreover, the grommet 1 has a cylindrical shaft coaxial with the axis of the fitting body 10, and has the inner cylinder 40 having a cylindrical shape, which is interposed at least one of between the one cylinder 30 and the harness body We or between the another cylinder 30 and the harness body We (FIGS. 1 to 6).

In a case where the inner cylinder 40 is interposed between the one cylinder 30 and the harness body We, an outer peripheral surface 40a is arranged to face an inner peripheral surface 30a of the one cylinder 30 with a gap G and drawn from the one drawing outlet 14 into the space part 11 to be coaxially connected to an inner peripheral edge of the sound insulation wall body 20 (FIG. 5). With this arrangement, tubular space S corresponding to the gap G is formed between the one cylinder 30 and the inner cylinder 40.

Further, in a case where the inner cylinder 40 is interposed between the another cylinder 30 and the harness body We, the outer peripheral surface 40a is arranged to face an inner peripheral surface 30a of the another cylinder 30 with a gap G, and drawn from the another drawing outlet 14 into the space part 11 to be coaxially connected to the inner peripheral edge of the sound insulation wall body 20. With this arrangement, tubular space S corresponding to the gap G is formed between the another cylinder 30 and the inner cylinder 40 (FIG. 5).

Further, in a case where the grommet 1 is interposed both between the one cylinder 30 and the harness body We and between the another cylinder 30 and the harness body We, the grommet 1 includes an inner cylinder 40 in which an outer peripheral surface 40a is arranged to face the inner peripheral surface 30a of the one cylinder 30 with a gap G and drawn from the one drawing outlet 14 into the space part 11 to be coaxially connected to the inner peripheral edge of the sound insulation wall body 20, and includes an inner cylinder 40 in which an outer peripheral surface 40a is arranged to face the inner peripheral surface 30a of the another cylinder 30 with a gap G and drawn from the another drawing outlet 14 into the space part 11 to be coaxially connected to the inner peripheral edge of the sound insulation wall body 20. With this arrangement, in the grommet 1, tubular space S corresponding to the gap G is formed between the one cylinder 30 and the inner cylinder 40, and tubular space S corresponding to the gap G is formed between the another cylinder 30 and the inner cylinder 40.

Here, in the grommet 1, a cylinder 30 having the inner cylinder 40 interposed between the cylinder 30 and the harness body We has a first cylindrical part 31 on the free end, a second cylindrical part 32 having a diameter larger than a diameter of the first cylindrical part 31 and being arranged closer to the drawing outlet 14 than the first cylindrical part 31, and an intermediate tubular part 33 in which an upper base side end is coaxially connected to an end of the first cylindrical part 31, which is on a side of a second cylindrical part 32 is, and a lower base side end is coaxially connected to an end of the second cylindrical part 32, which is on a side of the first cylindrical part 31 (FIGS. 1, 2, 4, and 5). For example, the intermediate tubular part 33 is formed in a truncated cone shape. The cylinder 30 may have the second cylindrical part 32 projected from a periphery of a drawing outlet 14, or may have a tubular part or truncated cone-shaped cylinder having another shape interposed between the second cylindrical part 32 and a periphery of the drawing outlet 14.

In contrast with the cylinder 30, a cylinder 30 not having the inner cylinder 40 interposed between the cylinder 30 and the harness body We has a cylindrical part 35 elastically deformed outward in the radial direction by the harness body We inside of the cylinder (FIGS. 1, 2, 4 and 5). The cylindrical part 35 may have an inner peripheral surface $30a_1$ pushed to move outward in the radial direction by the harness body We inside of the cylinder, or may be pushed to move outward in the radial direction by the harness body We inside of the cylinder via an inner rib 30b having an annular shape, which is coaxially provided on the inner peripheral surface $30a_1$. In the grommet 1 illustrated here, the harness body We inside of the cylinder expands the cylindrical part 35 to the outside in the radial direction via the inner rib 30b (FIG. 2).

Moreover, in the grommet 1, the inner cylinder 40 has a variable cylindrical part 41 that is elastically deformed in the radial direction by the harness body We inside of the cylinder, causes the outer peripheral surface 40a to adhere to the inner peripheral surface 30a of the first cylindrical part 31, and eliminates first tubular space (cylindrical-shaped space) S1 between the inner cylinder 40 and the first cylindrical part 31 in the tubular space S corresponding to the gap G (FIGS. 2, 3, 5, and 6). In the grommet 1, by eliminating only the first tubular space S1 between the first cylindrical part 31 and the variable cylindrical part 41 in the tubular space S, second tubular space S2 between the intermediate tubular part 33 and the inner cylinder 40 in the tubular space S and third tubular space (cylindrical-shaped space) S3 between the second cylindrical part 32 and the inner cylinder 40 are left (FIGS. 2 and 3). With this arrangement, in the grommet 1, the second tubular space S2 and the third tubular space S3, as well as a sealed air layer by annular space 11a in the space part 11, which is surrounded by the outer wall 12 of the fitting body 10, the sound insulation wall body 20, and the inner cylinder 40, are formed. The air layer is utilized as a first sound absorption chamber 1a that causes sound entered from outside of the grommet 1 to be absorbed.

Because an inner cylinder 40 is interposed between the cylinder 30 and the harness body We in the grommet 1, the harness body We pushes out the inner cylinder 40 from inside of the cylinder in the radial direction by simply inserting the harness body We inward, and therefore, it is possible to cause the outer peripheral surface 40a of the variable cylindrical part 41 of the inner cylinder 40 to adhere to the inner peripheral surface 30a of the first cylindrical part 31 and eliminate the first tubular space (cylindrical-shaped space) S1. That is, in the grommet 1, an air layer as the sealed first sound absorption chamber 1a surrounded by the cylinder 30, the inner cylinder 40, the fitting body 10, and the sound insulation wall body 20 is formed by simply inserting the harness body We inward. In the grommet 1, sound that has entered the space part 11 from the outside is absorbed in the first sound absorption chamber 1a, and therefore, it is possible to reduce sound leakage from inside of the space part 11, or the like, to the outside. Therefore, in the grommet 1, as compared with a conventional grommet, sound absorbency in the first sound absorption chamber 1a can be improved by simply inserting the harness body We inward. That is, the grommet 1 can improve soundproofing performance while improving assembly workability. Because the wire harness WH is provided with such a grommet 1, the wire harness WH can obtain an effect similar to an effect that the grommet 1 can obtain.

In the inner cylinder 40, the variable cylindrical part 41 may have an inner peripheral surface pushed to move outward in the radial direction by the harness body We inside of the cylinder, or may be pushed to move outward in the radial direction by the harness body We inside of the cylinder via an inner rib 40b (FIGS. 2, 3, 5, and 6) having an annular shape, which is coaxially provided on the inner peripheral surface.

It is desirable that the inner cylinder 40 is projected further outward than the first cylindrical part 31 is in the cylindrical shaft direction (FIGS. 1 to 6). On a side of the cylinder 30, when the harness body We is inserted, a jig is inserted inside of the variable cylindrical part 41, the cylinder 30 is expanded outward in the radial direction together with the variable cylindrical part 41 by the jig, and then, the harness body We is inserted into inside of the variable cylindrical part 41. Therefore, in the grommet 1, by leaving the inner cylinder 40 projected further outward than the first cylindrical part 31, pipe expansion work by the jig is easier, and assembly workability can be improved. Further, in addition to this, in the grommet 1, the harness body We inside of the cylinder can cause the outer peripheral surface 40a of a projection part of the inner cylinder 40 to adhere to the inner peripheral surface 30a of the first cylindrical part 31 even if the variable cylindrical part 41 is displaced inward to the first cylindrical part 31, and therefore, it is possible to improve adhesion between the inner peripheral surface 30a of the first cylindrical part 31 and the outer peripheral surface 40a of the inner cylinder 40. Further, for the grommet 1, adhesion of the first sound absorption chamber 1a is improved, and sound absorbency in the first sound absorption chamber 1a is improved by winding tape (illustration omitted) from the outer peripheral surface of the first cylindrical part 31 to the outer peripheral surface 40a of the projection part of the inner cylinder 40.

Further, in a case where the inner cylinder 40 is not interposed between the cylinder 30 and the harness body We in the grommet 1, the cylindrical part 35 of the cylinder 30 is pushed out in the radial direction by simply inserting the harness body We inward, and therefore, it is possible to reduce a gap between the inner peripheral surface $30a_1$ of the cylindrical part 35 and the harness body We. In the grommet 1, tape (illustration omitted) is wound from the outer peripheral surface of the cylindrical part 35 to the harness body We in order to fill a remaining gap between the inner peripheral surface $30a_1$ of the cylindrical part 35 and the harness body We, by which the air layer surrounded by the cylinder 30, the fitting body 10, and the sound insulation wall body 20 is formed as a second sound absorption chamber 1b (FIG. 2). The second sound absorption chamber 1b is formed in an annular shape by the harness body We inserted. In the grommet 1, sound that has entered the space part 11 from the outside is absorbed in the second sound absorption chamber 1b, and therefore, it is possible to reduce sound leakage from the space part 11 to the outside.

Specifically, in the grommet 1 illustrated here, the inner cylinder 40 is interposed between the first cylinder 30A and the harness body We, and the inner cylinder 40 is not interposed between the second cylinder 30B and the harness body We (FIG. 2).

Thus, the first cylinder 30A illustrated here has the first cylindrical part 31, the second cylindrical part 32, and the intermediate tubular part 33. The second cylindrical part 32 is projected from a periphery of the first drawing outlet 14A (FIGS. 2 and 5).

Further, the second cylinder 30B illustrated here has a cylindrical part (first cylindrical part) 35 on the free end side and a second cylindrical part 36 having a diameter larger than a diameter of the first cylindrical part 35 and arranged closer to the second drawing outlet 14B than the first cylindrical part 35 is (FIGS. 1, 2, 4, and 5). The second cylindrical part 36 is projected from a periphery of the second drawing outlet 14B. Moreover, between the first cylindrical part 35 and the second cylindrical part 36, the second cylinder 30B illustrated here has an intermediate tubular part 37 having a truncated cone shape in which a lower base side end is coaxially connected to an end of the second cylindrical part 36, which is on a side of the first cylindrical part 35 (FIGS. 1, 2, 4 and 5). The upper base side end of the intermediate tubular part 37 may be coaxially connected to an end of the first cylindrical part 35 on a side of the second cylindrical part 36, or may be coaxially connected to another cylindrical-shaped member interposed between the upper base side end and the first cylindrical part 35. The exemplified second cylinder 30B has a third cylindrical part 38 coaxially projected from the upper base side end of the intermediate tubular part 37, and an intermediate tubular part 39 having a truncated cone shape in which a lower base side end is coaxially connected to an end of the third cylindrical part 38, which is on a side of the first cylindrical part 35, and an upper base side end is coaxially connected to an end of the first cylindrical part 35, which is on a side of the third cylindrical part 38 (FIGS. 2 and 5). In the second cylinder 30B, inner ribs 30b are also provided on inner peripheral surfaces of the third cylindrical part 38 and the intermediate tubular part 39, and the harness body We inside of the cylinder expands the first cylindrical part 35, the third cylindrical part 38, and the intermediate tubular part 39 outward in the radial direction via each of the inner ribs 30b (FIG. 2).

Further, the inner cylinder 40 illustrated here is interposed between the first cylinder 30A and the harness body We, the outer peripheral surface 40a is arranged to face the inner peripheral surface 30a of the first cylinder 30A with a gap G, and the inner cylinder 40 is drawn from the first drawing outlet 14A into the space part 11 to be coaxially connected to the inner peripheral edge of the sound insulation wall body 20 (FIGS. 2 and 5). In the inner cylinder 40, the variable cylindrical part 41 has an inner rib 40b having an annular-shape in the inner peripheral surface, and is pushed to move outward in the radial direction by the harness body We inside of the cylinder via the inner rib 40b (FIGS. 2, 3, 5, and 6).

Therefore, in the grommet 1, by simply inserting the harness body We inward, the variable cylindrical part 41 is expanded outward in the radial direction, the first sound absorption chamber 1a is formed, by which sound absorbency in the first sound absorption chamber 1a can be improved.

The inner cylinder 40 illustrated here is projected further outward in the cylindrical shaft direction than the first cylindrical part 31 of the first cylinder 30A is, the first cylinder 30A being arranged to face the variable cylindrical part 41 in the radial direction (FIGS. 1 to 6).

The projection part of the inner cylinder 40 has an intermediate tubular part 42 having a truncated cone shape in which a lower base side end is coaxially connected an end of the variable cylindrical part (first cylindrical part) 41, and a second cylindrical part 43 coaxially projected from the upper base side end of the intermediate tubular part 42 (FIGS. 2 and 5). In the inner cylinder 40, inner ribs 40b are also provided on inner peripheral surfaces of the intermediate tubular part 42 and the second cylindrical part 43, and the harness body We inside of the cylinder expands the first cylindrical part 41, the intermediate tubular part 42, and the second cylindrical part 43 outward in the radial direction via each of the inner ribs 40b (FIG. 2). Therefore, in the inner cylinder 40, it is possible to, for example, cause the outer peripheral surface 40a of the intermediate tubular part 42 to adhere to the inner peripheral surface 30a of the first cylinder 30A even if the first cylindrical part 41 is displaced inward to the first cylinder 30A.

In the grommet 1 and wire harness WH illustrated here, for example, sound that has entered the space part 11 from a side of the second drawing outlet 14B is absorbed in the second sound absorption chamber 1b, and permeation of sound not absorbed in the second sound absorption chamber 1b is reduced in the sound insulation wall body 20, and sound permeated through the sound insulation wall body 20 is absorbed in the first sound absorption chamber 1a.

Because an inner cylinder is interposed between at least one cylinder and a harness body in a grommet and wire harness according to the present embodiment, the harness body pushes out the inner cylinder from inside of the cylinder in a radial direction by simply inserting the harness body inward, and therefore, it is possible to cause an outer peripheral surface of a variable cylindrical part in the inner cylinder to adhere to an inner peripheral surface of a first cylindrical part and eliminate cylindrical-shaped space. That is, in the grommet and wire harness, an air layer as a sealed sound absorption chamber surrounded by the cylinder, the inner cylinder, the fitting body, and a sound insulation wall body is formed by simply inserting the harness body inward. In the grommet and wire harness, sound that has entered a space part from outside is absorbed in the sound absorption chamber, and therefore, it is possible to reduce sound leakage from inside of the space part, or the like, to the outside. Therefore, in the grommet and the wire harness, as compared with a conventional grommet and wire harness, sound absorbency in the sound absorption chamber can be improved by simply inserting the harness body inward. That is, the grommet and wire harness according to the present embodiment can improve soundproofing performance while improving assembly workability.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A grommet comprising:
a fitting body that fits a periphery of a circular through hole of a wall body in an annular fitting groove of an outer wall, and allows a harness body routed in a space part inside of the outer wall along a hole axis of the circular through hole to be drawn out of the space part from each of drawing outlets on both ends in an axial direction, the drawing outlets having a circular shape;
an annular sound insulation wall body that has a central axis coaxial with an axis of the fitting body, and is projected in the space part from an inner peripheral wall surface of the outer wall;
a first cylinder and a second cylinder that each have a cylindrical shaft coaxial with the axis of the fitting body, are projected outward from a periphery of each of the drawing outlets, and allow the harness body in the space part to be drawn outward via inside of the first cylinder and the second cylinder; and
an inner cylinder that has a cylindrical shaft coaxial with the axis of the fitting body, is interposed between the first cylinder and the harness body, has an outer peripheral surface arranged to face an inner peripheral surface of the first cylinder with a gap, and is drawn from the drawing outlet into the space part to be coaxially connected to an inner peripheral edge of the annular sound insulation wall body, wherein
the first cylinder has a first cylindrical part on a free end, a second cylindrical part having a diameter larger than a diameter of the first cylindrical part and being arranged closer to the drawing outlet than is the first cylindrical part, and an intermediate tubular part in which an upper base side end is coaxially connected to an end of the first cylindrical part, the end being on a second cylindrical part side, and a lower base side end is coaxially connected to an end of the second cylindrical part, the end being on a first cylindrical part side, and
the inner cylinder has a variable cylindrical part that is elastically deformed outward in a radial direction by the harness body inside of the first cylinder, causes the outer peripheral surface to adhere to an inner peripheral surface of the first cylindrical part, and eliminates cylindrical-shaped space between the inner cylinder and the first cylindrical part in tubular space corresponding to the gap.
2. The grommet according to claim 1, wherein the inner cylinder is projected further outward in a cylindrical shaft direction than is the first cylindrical part.
3. The grommet according to claim 1, wherein the second cylinder has a cylindrical part elastically deformed outward in the radial direction by the harness body inside of the second cylinder.

4. The grommet according to claim 2, wherein
the second cylinder has a cylindrical part elastically deformed outward in the radial direction by the harness body inside of the second cylinder.

5. A wire harness comprising:
a harness body; and
a grommet that protects the harness body,
wherein the grommet includes
a fitting body that fits a periphery of a circular through hole of a wall body in an annular fitting groove of an outer wall, and allows a harness body routed in a space part inside of the outer wall along a hole axis of the circular through hole to be drawn out of the space part from each of drawing outlets on both ends in an axial direction, the drawing outlets having a circular shape,
an annular sound insulation wall body that has a central axis coaxial with an axis of the fitting body, and is projected in the space part from an inner peripheral wall surface of the outer wall,
a first cylinder and a second cylinder that each have cylindrical shaft coaxial with the axis of the fitting body, are projected outward from a periphery of each of the drawing outlets, and allow the harness body in the space part to be drawn outward via inside of the first cylinder and the second cylinder, and
an inner cylinder that has a cylindrical shape and has a cylindrical shaft coaxial with the axis of the fitting body, is interposed between the first cylinder and the harness body, has an outer peripheral surface arranged to face an inner peripheral surface of the first cylinder with a gap, and is drawn from the drawing outlet into the space part to be coaxially connected to an inner peripheral edge of the annular sound insulation wall body,
the first cylinder has a first cylindrical part on a free end side, a second cylindrical part having a diameter larger than a diameter of the first cylindrical part and being arranged closer to the drawing outlet than is the first cylindrical part, and an intermediate tubular part in which an upper base side end is coaxially connected to an end of the first cylindrical part, the end being on a second cylindrical part side, and a lower base side end is coaxially connected to an end of the second cylindrical part, the end being on a first cylindrical part side, and
the inner cylinder has a variable cylindrical part that is elastically deformed outward in a radial direction by the harness body inside of the first cylinder, causes the outer peripheral surface to adhere to an inner peripheral surface of the first cylindrical part, and eliminates the cylindrical-shaped space between the inner cylinder and the first cylindrical part in tubular space corresponding to the gap.

* * * * *